Figure 1:
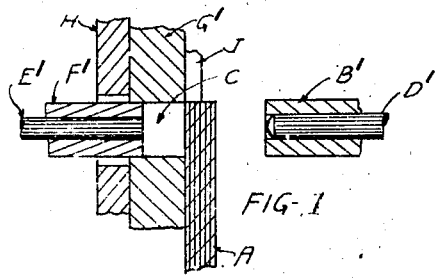

March 3, 1931. W. E. SHARP 1,794,737
PROCESS OF AND MEANS FOR MANUFACTURING NUT BLANKS
Filed June 30, 1924 2 Sheets-Sheet 1

INVENTOR.
BY
ATTORNEYS.

March 3, 1931.  W. E. SHARP  1,794,737

PROCESS OF AND MEANS FOR MANUFACTURING NUT BLANKS

Filed June 30, 1924   2 Sheets-Sheet 2

INVENTOR.

ATTORNEYS.

Patented Mar. 3, 1931

1,794,737

UNITED STATES PATENT OFFICE

WILLIAM ERASTUS SHARP, OF CHICAGO, ILLINOIS

PROCESS OF AND MEANS FOR MANUFACTURING NUT BLANKS

Application filed June 30, 1924. Serial No. 723,231.

My invention belongs to that general class of processes and methods, and the devices known as nut making machinery; it particularly relates to improved processes and tool designs and mechanism adapted for swaging a nut out of a bar of any kind of suitable material, preferably iron or steel.

This invention has among its objects the practical and economical production of an iron or steel nut in which a better quality of blank and a smoother thread may be produced, due to a more densely formed material, also the production of a nut of superior outside finish, smoother than hot pressed nuts made by any other process. Through the use of this invention a less amount of scrap is produced in forming nuts than is produced by any other process.

To this end, my invention consists in a new and novel process and the construction, arrangement, and combination of mechanism herein shown and described, and more particularly pointed out in the claims.

Figure 9:
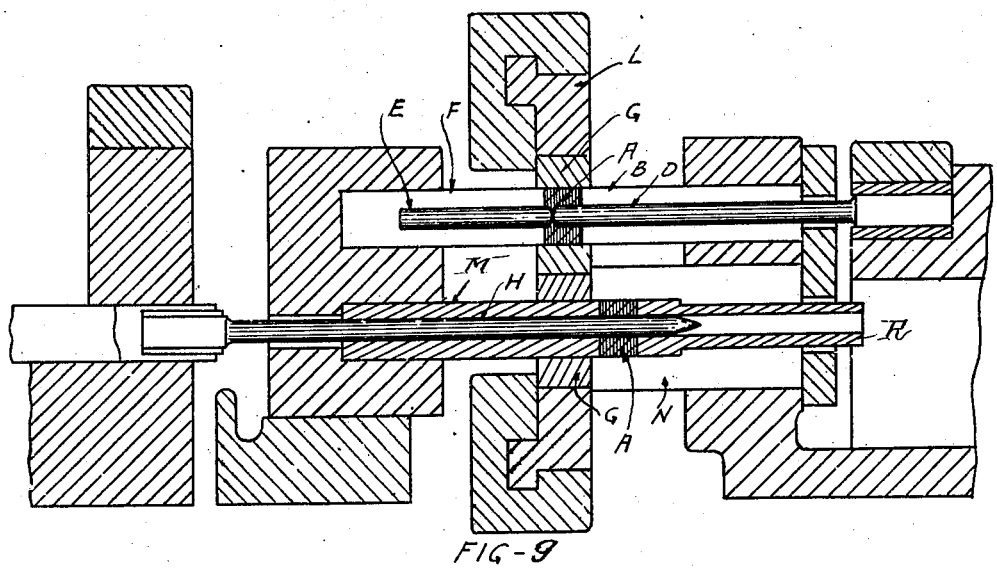
Figure 10:
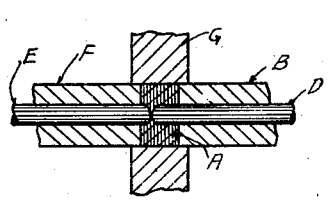
Figure 11:
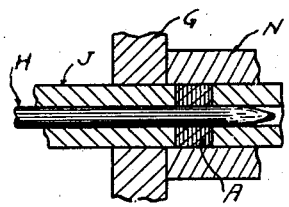

In the drawings;

Fig. 1 is a section taken through apparatus embodying the invention and adapted to produce nut blanks by practising my improved method;

Figs. _ .o 8, inclusive, are sections taken on substantially the same line as Fig. 1, but illustrating various steps of my improved method;

Fig. 9 is a section taken through apparatus embodying another form of the invention; and Figs. 10 and 11 are sections taken through portions of the apparatus shown in Fig. 9 and on substantially the same line, but illustrating positions parts of the apparatus assume during the operation of the apparatus.

It is believed that a complete understanding of my improved method will be had from a description of apparatus employed to practise it.

Referring for the present to Figs. 1 to 8, inclusive, wherein I have illustrated apparatus for practising one form of the invention, the reference character G' designates a die-block having a die-box C of any desired shape. Thus, the die-box C may be hexagonal or square to form hexagonal or square nuts, respectively. For the purpose of illustration, the die-block G' is shown positioned upon a frame member H and is provided with a stop J against which stock A may be positioned to accurately align it with the die-box C. Slidably mounted in any suitable means (not shown) is a cutoff tool B' in which an ejector, swaging or back-up tool D' is slidably journaled, the back-up tool D' being preferably provided with a convex surface at its forward end. Aligned with the cutoff tool B' and the die-box C is a knockout tool or crowner F' slidably journaled in any suitable means (not shown), the tool F' having a swaging tool E' slidably journaled therein. The tool E' is preferably formed so that it may be employed to remove a relatively small amount of scrap from the nut blanks. Suitable means (not shown) such as cams, gears, eccentrics, or the equivalent, are provided for reciprocating the tools B', D', E' and F' in such manner that they will function as hereinafter set forth.

Figure 2:
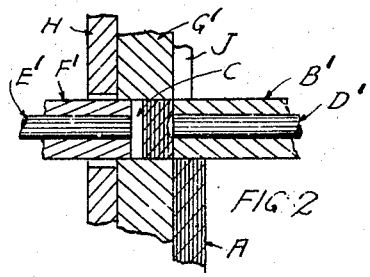
Figure 3:
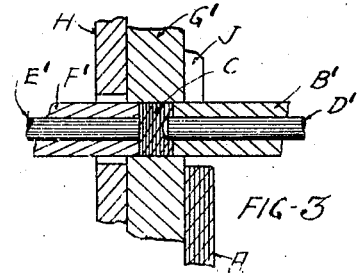

Referring to Fig. 1, it will be noted that one end of the stock A is positoned against the stop J in such manner that the cutoff tool B' may sever a portion of definite size from the stock and drive it into the die-box C, as illustrated in Fig. 2. It will be noted that in each of Figs. 1 to 7, inclusive, the knockout tool F' occupies substantially the same position relative to the die-block G' so that it serves as a wall for the die-box C. As shown in Fig. 3, the cutoff tool B' is driven into the die-box C during the operation of the apparatus and cooperates with the knockout tool F' to subject the portion cut from the stock A to considerable pressure, this portion being an unfinished nut blank.

Figure 4:
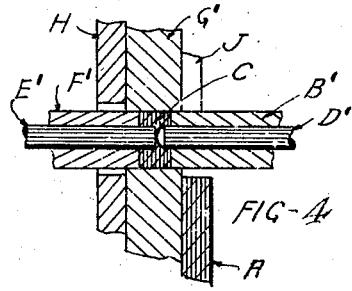
Figure 5:
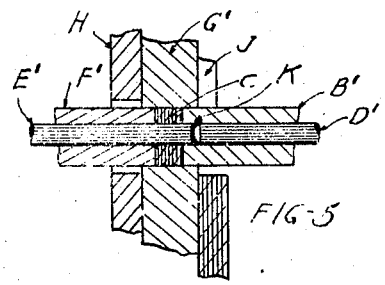

Referring now to Fig. 3, it will be noted that the tool D' is displaced relative to the tool B' when the tool B' enters the die-box C, so that it will enter the nut blank and displace the material thereof against the walls of the die-box C. The tool D' is assisted in this operation by the tool E', which moves forwardly in the tool F' until its forward end is disposed in close proximity to the convex end of the tool D'. The apparatus is so proportioned that when the tools E′ and D′ occupy the relative positions wherein they are shown in Fig. 4, the material in the nut blank will fill the interior of the die-box C and the nut blank will have the form, hexagonal, or otherwise, which it is desired to impart thereto. It may be said that the tools E′ and D′ in reality swage the nut blank into the desired form and do not simply pierce it. This results in a relatively small amount of scrap, which is indicated at K in Figs. 5 to 7, inclusive.

Figure 6:
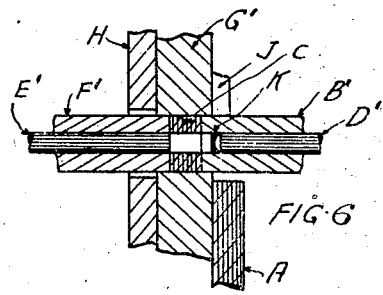
Figure 7:
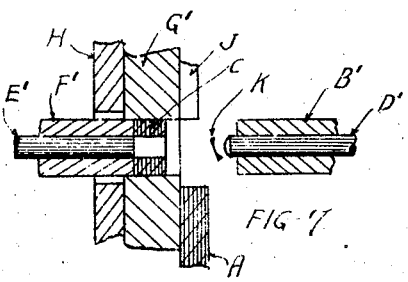
Figure 8:
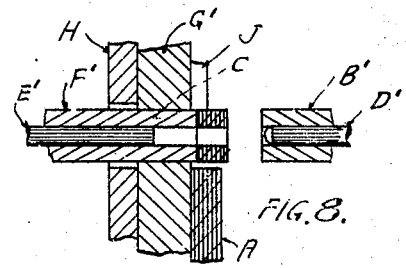

After the tools E′ and D′ have assumed the positions wherein they are shown in Fig. 4, the tool D′ is retracted and is followed by the tool E′, which displaces the slug or scrap K and carries it into the tool B′. The tool E′ is then retracted into the position wherein it is shown in Figs. 1 and 6, and the tools B′ and D′ are retracted to the positions wherein they are shown in Fig. 7, the tool B′ being displaced relative to the tool D′ in such manner that the slug K is ejected from the tool B′. The next step of the improved method is illustrated in Fig. 8, wherein the tool F′ has been advanced to eject the finished nut blank from the die-box C. The several tools are then returned to the positions wherein they are shown in Fig. 1 and the above described cycle of operations is repeated.

In Figs. 9 to 11, inclusive, I have illustrated another form of the invention, which comprises tools B, D, E and F, which are substantially identical to the tools B′, D′, E′ and F′, respectively, shown in Figs. 1 to 8, inclusive, means (not shown) being provided for causing the tools B, D, E and F of Figs. 9, 10 and 11 to function in much the same manner as the like identified tools of Figs. 1 to 8, inclusive. The tool E, however, is preferably provided with a convex forward end in the embodiment of the invention illustrated in Figs. 9 to 11, inclusive, as no scrap or slugs are removed from the nut blanks. It will be noted that I have provided a plurality of die-blocks G in an indexing head L which may be rotated to bring either of the die-blocks G into alignment with a swaging tool H slidably journaled in a tool M, the tool M being aligned with a back-up tool R slidably journaled in a bushing N.

By employing apparatus embodying this form of the invention, I am able to produce articles of the character described without any waste whatever as the tools E and D are designed to swage the nut blank in such manner that the hole therethrough is nearly completed by the tools before they are withdrawn from the blank. The tool E is not passed through the nut but is preferably retracted simultaneously with the tool D. The nut blank is then advanced into the position wherein it is aligned with the swaging tool H, which passes entirely through the blank piercing and smoothing out the hole in the nut to the desired dimensions and at the same time swaging out the body of the blank to firmly fit the walls of the enclosing die. The swaging tool H is then withdrawn and the blank is discharged. It will be noted that the forward end of the tool H is preferably pointed so that it does not function as a cutting punch.

When my improved method is practised, the material in the nut blank is compressed or impacted to a certain extent and the exterior of the blank is forcibly pressed against the enclosing wall of the die to form smooth and satisfactory surfaces on the blank which ordinarily require no further finish to enable it to be satisfactorily marketed.

Having thus described my invention, it is obvious that various immaterial modifications may be made in the process and the means for carrying it into effect without departing from the spirit of my invention, hence I do not wish to be understood as limiting myself to the exact steps set forth or the form, construction, arrangement, or combination of parts herein shown and described, or mentioned beyond that set forth in the claims herein.

What I claim as new and desire to secure by Letters Patent is:

1. A method of producing a nut blank, which method comprises driving oppositely disposed non-rotatable swaging tools into a piece of metal in such manner that they substantially engage each other, withdrawing said swaging tools, and then passing a third swaging tool through said piece of metal to complete and smooth the hole formed by the first-mentioned swaging tools, the metal displaced by said tools being all retained in said piece of metal.

2. The method of forming nuts, comprising cutting a piece of metal from stock, forcing said metal into a die box, against tools that are held stationary, moving a swaging tool and an ejector into said metal to compress a central portion thereof, leaving a thin core, and to expand the outer surface within the die box, withdrawing the ejector and swaging tool, and advancing a relatively pointed swaging tool through the thin core, to smooth out the hole in the blank, without the formation of scrap.

3. The method of producing nut blanks, comprising cutting a piece of metal from stock and forcing it into a die box against a temporarily stationary and non-rotating crowner and a swaging tool, swaging the metal by moving the swaging tool longitudinally toward an aligned ejector and at the same time moving said ejector toward said swaging tool to compress a central portion of the metal to form a thin core between said ejector and swaging tool and to expand the outer surface of the said piece of metal to fill the die box, moving said die box until the piece of metal is aligned with a relatively pointed swaging tool, and moving said last mentioned tool into said metal to complete the formation of the hole therethrough by piercing the thin core formed during the first swaging operation and forcing the metal thereof into the body of the blank.

4. Apparatus for forming nut blanks, comprising a crowner, a cut-off tool, a plurality of die blocks mounted in a head adapted to be rotated to align said blocks with said tools, a swaging tool operable in said crowner and an ejector operable in said cut-off tool, said crowner and swaging tool being stationary while the cut-off tool forces a piece of metal into the said die block and while the swager and ejector operate together to squeeze the central portion of the metal thus to produce a thin core therebetween and to expand the metal into the die block, said ejector and swager being then adapted to be withdrawn, and a relatively pointed swaging tool adapted to operate in said die block after the same has been moved to alignment therewith and to pierce the core in the piece of metal to complete the formation of the blank.

5. In apparatus for forming nut blanks, a die movable into a plurality of positions, a plurality of blunt swaging tools aligned with one of said positions and adapted to partially form the bolt hole, and a pointed swaging tool aligned with another of said positions and adapted to pierce the metal remaining and to complete the bolt hole.

In testimony whereof, I have hereunto signed my name.

WILLIAM ERASTUS SHARP.